United States Patent
Graham et al.

[15] 3,681,429
[45] Aug. 1, 1972

[54] COMPLEX OF THE METHYL ESTERS OF 3-AMINO-2,5-DICHLOROBENZOIC ACID AND 2,5-DICHLORO-3-NITROBENZOIC ACID

[72] Inventors: David E. Graham, Westfield; Thomas Schulze, Elizabeth; Marvin M. Fein, Westfield, all of N.J.

[73] Assignee: GAF Corporation, New York, N.Y.

[22] Filed: March 11, 1970

[21] Appl. No.: 18,768

[52] U.S. Cl. .............................260/471 R, 71/111
[51] Int. Cl. .............................................C07c 101/54
[58] Field of Search ...............................260/471 R

[56] References Cited

UNITED STATES PATENTS 3,530,181  9/1970  Soloway et al. ...........260/471 R

*Primary Examiner*—Lorraine A. Weinberger
*Assistant Examiner*—L. Arnold Thaxton
*Attorney*—Samson B. Leavitt and Walter C. Kehm

[57] ABSTRACT

A novel complex which is formed when essentially equimolar proportions of the methyl ester of 3-amino-2,5-dichlorobenzoic acid and the methyl ester of 2,5-dichloro-3-nitrobenzoic acid are heated together which complex shows herbicidal activity.

1 Claim, No Drawings

COMPLEX OF THE METHYL ESTERS OF 3-AMINO-2,5-DICHLOROBENZOIC ACID AND 2,5-DICHLORO-3-NITROBENZOIC ACID

The instant application is directed to a novel complex of the methyl esters of 3-amino-2,5-dichlorobenzoic acid and 2,5-dichloro-3-nitrobenzoic acid.

The individual components of the novel complex of the instant invention are well known herbicidal compounds which exhibit exceptionally high degrees of selectivity for undesirable vegetation and noxious weeds without adversely affecting the desirable crops. These compounds are discussed in detail in U.S. Pat. Nos. 3,013,873 and 3,014,063, the disclosures of which are incorporated herein by reference. It is noted, however, that these compounds have been found to be particularly expensive, and therefore, the use thereof has been somewhat limited. The 3-amino-2,5-dichlorobenzoic acid compound and its esters have been preferred over the 2,5-dichloro-3-nitrobenzoic acid esters inasmuch as the amino derivative has a lower volatility and therefore a lower phytotoxicity on a number of desirable crops (e.g., on soybeans or tomatoes, particularly when applied to such crops grown in sandy soils in warmer areas such as the southern United States). While the amino form is the preferred form, it is noted that said amino form is produced by reduction of the nitro derivative, the amino derivative is necessarily substantially more expensive than the nitro derivative, and the expense thereof has limited its use to some extent. The novel complex of the instant invention, however, has been found to have substantially the same low volatility as the amino derivative above and similar low phytotoxicity on soybeans, tomatoes and a number of other desirable crops; however, said complex requires only half as much of the more expensive amino derivative for its production inasmuch as it is a complex of the 3-amino-2,5-dichlorobenzoic acid ester and the 2,5-dichloro-3-nitrobenzoic acid ester, and is thus substantially lower in cost than the amino derivative.

As a result of applicants' efforts, they have unexpectedly found that when one heats the methyl ester of 3-amino-2,5-dichlorobenzoic acid in the presence of the methyl ester of 2,5-dichloro-3-nitrobenzoic acid, one obtains a complex thereof which complex is not a simple mixture of the two compounds. While the exact form of complexing is not known, it has definitely been shown that the product obtained as a result of the complexing, is different from a mere physical mixture of the individual ingredients as is evidenced by the lower volatility of the complex over that of a mere mixture. From the infra-red curves of this novel complex, it appears that the amino group of the 3-amino-2,5-dichlorobenzoic acid ester is involved in the complex formation. Further physical data will be presented hereinafter to substantiate the complex formation.

The novel complex of the instant invention is readily synthesized by mixing 3-amino-2,5-dichlorobenzoic acid methyl ester and the 2,5-dichloro-3-nitrobenzoic acid methyl ester and heating the resulting mixture. Such heating is preferably carried out at a temperature of at least about 80°C. (the melting point of the 2,5-dichloro-3-nitrobenzoic acid methyl ester). A preferred temperature range for heating is about from 80°C. to about 100°C. or slightly higher. The mixture of the two individual methyl esters may be heated in bulk or, if desired, the heating step may be affected in an inert solvent, preferably a solvent such as methanol in which each of the individual methyl esters is soluble but in which the novel complex of the present invention is relatively insoluble. In place of heating the mixture of the esters, the novel complex of the present invention may be formed by subjecting such mixture to X-ray diffraction conditions or by intimately grinding the two esters (in solid form) together. Since the novel complex of the present invention is composed of essentially equal molar proportions of the two methyl esters, it is preferred to mix the two esters in substantially equimolar proportions. However, a substantial excess of either of the methyl esters may be employed, with the excess remaining in the final product or if desired, the excess may be removed and recovered from the essentially equimolar complex which is formed by several means such as crystallization.

The resultant complex has been thoroughly tested resulting in the conclusion that in fact a chemical complex results rather than a mere admixture of the individual ester components. That is to say, the 3-amino-2,5-dichlorobenzoic acid methyl ester has a melting point of approximately 64.5°–66°C. The 2,5-dichloro-3-nitrobenzoic acid methyl ester has a melting point 80°–81.5°C. Whereas, an equimolar complex of the two esters has been found to have a melting point of 85°–86°C., thus leading to the belief that a complex rather than an admixture was formed. It is further noted that a mere blend or admixture of the two components when heated from 25°–100°C. clearly exhibits three distinct melting points, one at 63°, one at 75° and one between 82° and 85° thus corresponding directly to the individual components of the blend and the novel complex of the instant invention which results from the heating process. Upon further testing, it was found that when the mixture of the blend tested above was cooled to room temperature and re-heated, the melting points of the individual methyl esters completely disappeared and only the melting point of the novel complex of the instant invention was found to be present. This was explained when it was found that there was a partial formation of novel complex of the instant invention below 80°C. during the first heating from 25°–100°C. and the reaction was completed while heating to 100°C. the second time.

In addition to the differential thermal analysis discussed above, thermogravimetric analysis demonstrated similar behavior. X-ray diffraction studies were also run on each of the individual esters, i.e., the methyl ester of 3-amino-2,5-dichlorobenzoic acid and the methyl ester of 2,5-dichloro-3-nitrobenzoic acid, the complex of the instant invention and an equimolar blend of each of the methyl esters. The samples were subjected to X-ray analysis using CuK$\alpha$ radiation at 40 KV and 35 ma. It was found that the methyl ester of 3-amino-2,5-dichlorobenzoic acid is characterized by intense reflection at 11.1 A spacing, by reflection of medium intensities at 4.39 A and 3.53 A and low intensity reflections at 3.97 A, 3.80 A, 3.70 A, 3.65A, 3.39A, 3.27 A, 3.24 A, 2.96 A, 2.73 A, 2.52 A, and 2.48 A spacings. The methyl ester of 2,5-dichloro-3-nitrobenzoic acid is characterized by high intensity reflections at 8.75 A, 4.39 A, 4.26 A, 3.61 A and 3.11 A, by reflections of medium intensity at 4.03 A and 3.27 A, and by low intensity reflections at 4.15 A, 3.74 A, 3.15 A, 2.96 A, 2.90 A, 2.84 A, 2.78 A, 2.59 A, and 2.58 A spacings. As clearly distinguished therefrom the novel complex of the instant invention is characterized by high intensity reflections at 11.47 A, 6.80 A, 4.34 A, and 3.46 A, 2.90 A by reflections of medium intensity at 4.75 A, 3.91 A, 3.65 A, 3.40 A, 3.03 A, 2.54 A, and 2.33 A, and by low intensity reflections at 9.4 A, 8.75 A, 5.53 A, 3.21 A, 3.15 A, 2.78 A, 2.73 A, 2.64 A, 2.41 A, and 2.32 A spacings. Furthermore, the equimolar blend of each of the above esters was found to have an X-ray diffraction pattern similar to the novel complex of the instant invention. However, as was noted above, it has been found that under X-ray analysis conditions the novel complex of the instant invention is formed thus explaining this result.

Table 1 below summarizes the spacings and relevant intensity of the X-ray reflections of each of the above tested samples. As will readily be appreciated, this summary clearly demonstrates that a complex is formed of the individual methyl esters rather than a mere admixture thereof.

TABLE 1

Summary of the Spacings and Relative Intensity of X-ray Reflections

| Spacing of Reflection D A | (I) Amiben Methyl Ester | (II) Dinoben Methyl Ester | (III) Amiben/Dinoben Methyl Ester | (IV) Equimolar Blend |
|---|---|---|---|---|
| 11.47 | — | — | 55 | 7 |
| 11.10 | 100 | — | — | — |
| 9.40; 9.30 | — | — | 19 | 12 |
| 8.75; 8.84 | — | 77 | — | 11 |
| 7.82; 7.89 | — | — | 10 | 10 |
| 6.80 | — | — | 65 | 12 |
| 5.53; 5.57 | — | — | 10 | 20 |
| 4.75 | — | — | 30 | 7 |
| 4.39 | 16 | 41 | — | — |
| 4.34 | — | — | 100 | 7 |
| 4.26 | — | 43 | — | — |
| 4.15 | — | 8 | — | — |
| 4.03 | — | 32 | — | — |
| 3.97 | 11 | — | — | — |
| 3.91; 3.93 | — | — | 30 | 21 |
| 3.80 | 10 | — | — | — |
| 3.70; 3.74 | 6 | 13 | — | — |
| 3.65; 3.65; 3.67 | 8 | — | 30 | 10 |
| 3.61 | — | 100 | — | 20 |
| 3.53; 3.52 | 23 | — | — | 7 |
| 3.46 | — | — | 53 | 100 |
| 3.39; 3.40 | 11 | — | 23 | — |
| 3.27; 3.29; 3.31 | 9 | 32 | — | 8 |
| 3.24; 3.21; 3.23 | 6 | — | 14 | 10 |
| 3.15 | — | 8 | 12 | — |
| 3.11; 3.10 | — | 47 | — | 10 |
| 3.03 | — | — | 29 | 15 |
| 2.96; 2.97 | 7 | 8 | — | — |
| 2.90 | — | 8 | 72 | 12 |
| 2.84 | — | 10 | — | — |
| 2.77; 2.78; 2.80 | — | 10 | 12 | 5 |
| 2.73 | 5 | — | 16 | — |
| 2.64 | — | — | 12 | — |
| 2.59 | — | 16 | — | — |
| 2.58 | — | 8 | — | — |
| 2.54 | — | — | 30 | — |
| 2.52 | 9 | — | — | — |
| 2.48 | 6 | — | — | 10 |
| 2.41 | — | — | 13 | — |
| 2.33 | — | — | 25 | 11 |
| 2.32; 2.31 | — | — | 12 | 5 |

As was discussed above, the novel complex of the instant invention has been found to be an extremely useful herbicide in light of its low volatility and furthermore relatively low cost in light of the fact that only one-half of the more expensive amino component is necessary for effectiveness. Furthermore, crop damage as a result of the use of a high level of the individual herbicides is decreased in light of the fact that only one-half thereof is necessary for effective action. The complex of the instant invention is an equimolar complex comprising approximately one-half of the methyl ester of 3-amino-2,5-dichlorobenzoic acid and one-half of the methyl ester of 2,5-dichloro-3-nitrobenzoic acid, each of which esters has the following formulas, respectively:

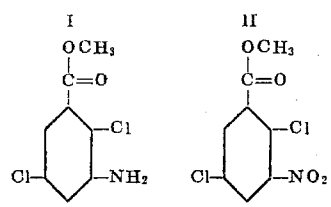

The instant invention will now be explained in more detail in connection with the following examples thereof. It is to be noted, however, that the instant invention is not deemed as being limited thereto.

EXAMPLE I

Fifty-five gm (0.25 moles) of methyl-2-amino-2,5-dichlorobenzoate and 62.5 gm (0.25 moles) of methyl 2,5-dichloro-3-nitrobenzoate were mixed and methanol was added to a total volume of 300 cc. The mixture was heated to solution and then cooled to room temperature with agitation. A crop began to crystalize at 48°C. The crop was filtered at room temperature and washed with three portions of 25 cc ice cold methanol and air dried, resulting in 89.4 gm, m.p. 85°–86C. Two more crops were obtained by concentration, giving a total of 113.8 gm of the compound, 96.8 percent of theory. Analytical data for the first crop of product (complex) crystals was as follows:

|  | Found | Theory for equimolar compound |
|---|---|---|
| Methyl-2-5-dichloro-3-nitrobenzoate by TiCl$_3$ | 56.1 | 53.1 |
| Methyl-3-amino-2,5-dichlorobenzoate by diazotization | 45.3 | 46.9 |
| Total chlorine, Parr Bomb | 29.8 | 30.2 |
| Labile chlorine, piperidine method | 7.86 | 7.57 |

Vapor Phase Chromatography:
  50.30 percent methyl-2,5-dichloro-3-nitrobenzoate
  49.31 percent methyl-3-amino-2,5-dichlorobenzoate
Mixed melting points:
  A. 80 percent methyl-2,5-dichloro-3-nitrobenzoate (m.p. 80.5°–81°), 20 percent compound = 74°–78.5°.
  B. 80 percent methyl-3-amino-2,5-dichlorobenzoate (m.p. 64.5°–66°C), 20 percent compd. = 61.5°–83°C.

EXAMPLE II 4.40 gms of methyl-3-amino-2,5-dichlorobenzoate ( 0.02 moles) and 5.00 gm. methyl-2,5-dichloro-3-nitrobenzoate (0.02 moles) were thoroughly mixed and heated gradually in a melting point apparatus with the following results:

| T°C | |
|---|---|
| 58.5 | softening |
| 65 | continues to soften |
| 69 | appears to fuse |
| 69–72 | goes completely solid |
| 75 | spots |
| 78 | soft |
| 81 | begins to melt |
| 83–85 | melts (most melted 84°–85°C) |

The melting point tube was cooled to solidify and the melting point taken. It was solid to 80°C., softened at 80° and melted at 84°–85.5°C.

EXAMPLE III

Five gm methyl-2,5-dichloro-3-nitrobenzoate (.02 moles) and 10 gm methyl-3-amino-2,5-dichlorobenzoate (0.046 moles) were mixed and enough methanol added to form 130 cc. of mixture. The mixture was heated to solution and cooled to approximately 5°C. with agitation. The crop was filtered, washed with ice cold methanol, and air dried giving 7.1 gm of the compound, m.p. 85.5°–86°C. A second crop, 1.6 gm, m.p. 84°–85°C, was obtained by concentrating the filtrate. Total yield of the compound was 8.7 gm = 92.5 percent of theory.

EXAMPLE IV

The method of Example III was followed using an excess of methyl-2,5-dichloro-3-nitrobenzoate, a 72.8 percent yield of a somewhat less pure material was isolated, m.p. 82.5°–84.5°C.

EXAMPLE V 0.11 grams of methyl-3-amino-2,5-dichlorobenzoate and 0.125 grams of methyl-2,5-dichloro-3-nitrobenzoate were charged to a small vial along with several agate balls and the vial stoppered and place on a laboratory vibrator for 0.2 hours at ambient temperatures. The thus produced product has a melting point of 83°–84.5°C.

When subjected to infrared analysis, the curve for the product was essentially the same as that for the product of Example I above showing the same differences from the infrared curves for the two starting esters.

EXAMPLE VI

The novel complex of the instant invention was tested to determine its herbicidal activity. The compound was applied in pre-emergence tests at a rate of 8 pounds/acre. Visual observations were recorded with the following results:

| Test Plant: | Visual Observations |
|---|---|
| Wheat | No observable injury. |
| Corn | No observable injury. |
| Onion Sets | No observable injury. |
| Snapbeans | No observable injury. |
| Soybeans | No observable injury. |
| Wild Oats | Moderate injury. |
| Foxtail | Total kill. |
| Ryegrass | Severe injury. |
| Crabgrass | Total kill. |
| Johnson Grass | Severe injury. |
| Dock | Severe injury. |
| Mustard | Total kill. |
| Pigweed | Total kill. |
| Lambs Quarter | Total kill. |
| Chickweed | Total kill. |

As is readily apparent from the above examples, by combination of the methyl ester of 3-amino-2,5-dichlorobenzoic acid and the methyl ester of 2,5-dichloro-3-nitrobenzoic acid, a new equimolar complex of the individual esters has been formed which complex is an extremely useful herbicide having benefits previously unobtainable with prior art compounds.

What is claimed is:

1. A substantially equimolar complex of the methyl ester of 3-amino-2,5-dichlorobenzoic acid and the methyl ester of 2,5-dichloro-3-nitrobenzoic acid, said complex being characterized by a melting point of about 85°–86°C.

* * * * *